Sept. 23, 1924. 1,509,301
E. J. KEARNS
NONSKID TIRE
Filed Jan. 22, 1924 2 Sheets-Sheet 1

INVENTOR.
EDWARD J. KEARNS
BY Joseph J. O'Brien
ATTORNEY.

Sept. 23, 1924.

E. J. KEARNS

NONSKID TIRE

Filed Jan. 22, 1924    2 Sheets-Sheet 2

1,509,301

INVENTOR.
EDWARD J. KEARNS
BY Joseph J. O'Brien
ATTORNEY.

Patented Sept. 23, 1924.

1,509,301

UNITED STATES PATENT OFFICE.

EDWARD J. KEARNS, OF SPRINGFIELD, MASSACHUSETTS, ASSIGNOR TO NEW ENGLAND TIRE & RUBBER COMPANY, OF HOLYOKE, MASSACHUSETTS, A CORPORATION OF DELAWARE.

NONSKID TIRE.

Application filed January 22, 1924. Serial No. 687,691.

*To all whom it may concern:*

Be it known that EDWARD J. KEARNS, a citizen of the United States of America, residing at Springfield, in the county of Hampden and State of Massachusetts, has invented certain new and useful Improvements in Nonskid Tires, of which the following is a specification.

This invention relates to improvements in vehicle tires and its leading object is to provide a tire with a non-skid tread composed of a resilient material, such as rubber, and fabric, having its ends projecting through the resilient material or rubber so as to wear along the shanks of the fibre threads in the direction of their lengths, rather than transversely, and so as to maintain constant ground gripping engagement with the roadbed during all stages of the life of the tire.

A still further object of the invention is the provision of a tire with a tread composed of laminations of fabric and rubber or resilient material, in which the threads of the fabric are disposed in radial lines and project through the ground engaging surface of the tire.

With the above and other objects in view the invention consists of certain new and useful constructions, combinations and arrangements of parts, clearly described in the following specification and fully illustrated in the accompanying drawings, in which:—

Figure 1:
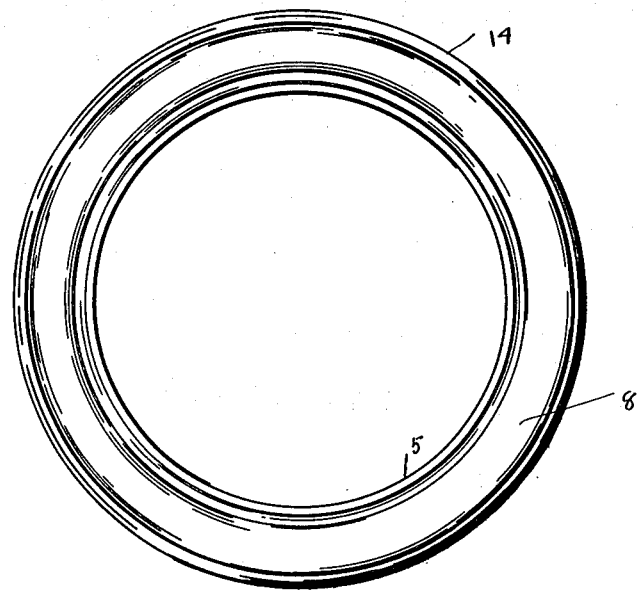
Fig. 1 is a plan view of a tire embodying my invention.
Figure 2:
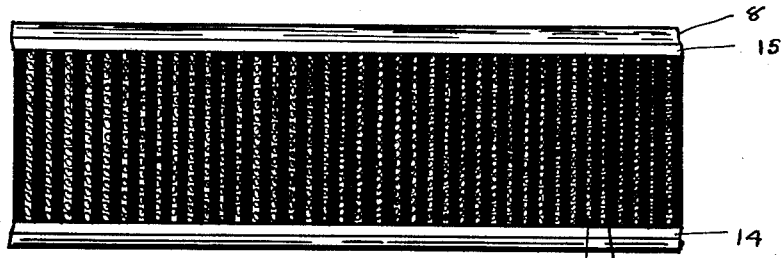
Fig. 2 is a detail plan on an enlarged scale, showing one method of arranging the laminations.
Figure 3:
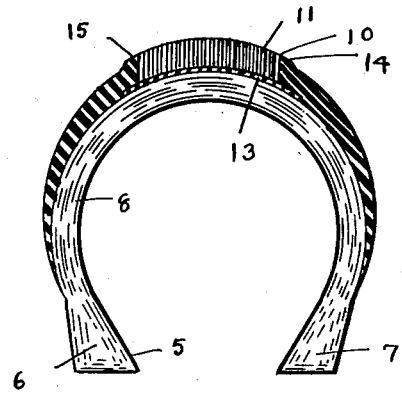
Fig. 3 is a vertical sectional view.

Referring to the accompanying drawings 5 designates the base of the improved tire, which may be of any conventional or special construction, and which includes the usual beads 6 and 7. The case 8 is composed of the usual cord layers suitably embedded in rubber properly vulcanized. Any form of casing construction may be employed, in the case of a pneumatic tire, and any form of body construction may be employed in the case of any other type of tire.

The tread 10 is composed of a series of cord laminations 11 and a series of rubber laminations 12, arranged in alternations so that the rubber lies between the confronting cord laminations and performs the double function of acting as a bonding or binder to hold the fabric laminations against separation, and provides a cushion between the adjoining layers of fabric.

The laminations 11 and 12 are preferably mounted on a layer of cushioning rubber 13 which is vulcanized in the process of manufacture to the case 8, and which forms a binder to unite the laminations 11 and 12 to the case.

The ends of the laminations are protected by portions or rings 14 and 15 of cushion tread rubber, and these portions or rings extend to the same plane as the outer faces of the laminations 11 and 12.

Figure 4:
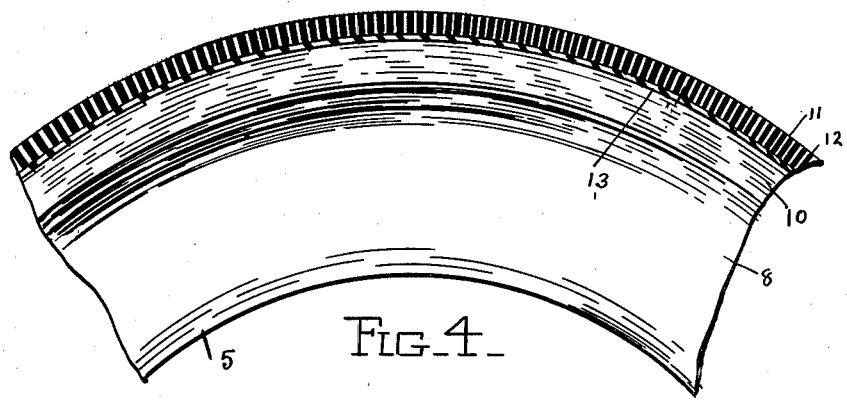
Fig. 4 is a detail longitudinal sectional view, taken on an enlarged scale.
Figure 5:
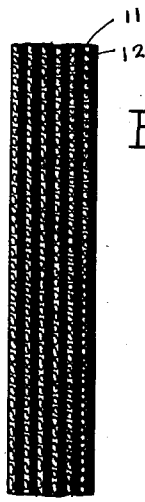
Fig. 5 is a detail plan view of a series of blocks consisting of laminations of fibre and rubber, before being incorporated in the body of the tire tread.

The threads of the cord laminations are disposed radially as indicated in Fig. 4 and the ends of the threads or cords project through the outer face of the rubber so as to be normally exposed to wear from direct traction with the ground or roadbed. In this way an effective non-slipping surface composed of laminations of cushion tread rubber and cord threads is provided. It is found in actual practice that a tire provided with the improved tread will not slip, as the cord will effectively resist slipping or skidding and the rubber provides the necessary cushion to insure easy riding and long wearing qualities.

In manufacturing a tire with the improved tread the casing is built up in the usual manner and then a series of blocks consisting of the laminations 11 and 12 are laid on the outer surface of the casing, and the whole vulcanized: the side protecting or guard strips or portions being applied in proper form and vulcanized with the tread, so as to provide a unified tread body.

The rubber of the laminations is uncured or partly cured, as the judgment of the tire builder may suggest.

Figure 7:
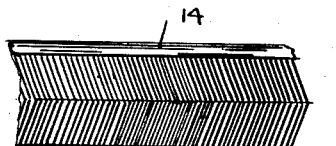
Fig. 7 is a detail plan view on a reduced scale of a slightly modified form of tread, showing a reverse angular disposition of the laminations.
Figure 6:
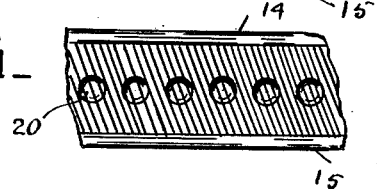
Fig. 6 is a detail plan view, on a reduced scale, showing a tire tread provided with vacuum cups.
Figure 8:
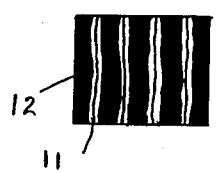
Fig. 8 is a detail sectional view, magnified, showing the arrangement of the cord threads in rubber.

The laminations may be disposed at various angles to each other, in many different arrangements, as indicated in Figs. 6 and 7.

In Fig. 6 I show a tread having a series of recesses or the like 20 formed to provide so-called vacuum pockets. These recesses or pockets are constructed by subjecting the tread built of the cord and rubber laminations to suitable pressure in a mold, so as to compress the composite tread material, thus providing a tread composed of areas of varying density.

Other material than fibrous material used in the making of tire fabrics and cord layers may be employed in the manufacture of the improved tire tread, such as vegetable fibres, artificial fibres, or any other thread-like material, woven or otherwise. Hemp, linen, jute, sisal, wire grass, or any other material may be employed, which will permit of vulcanization.

The invention is not limited to the particular arrangement of laminations disclosed and covers any arrangement wherein the ends of the fibres are exposed for traction.

Instead of building up the improved tread from a series of blocks a number of strips containing the laminations or a single strip containing a sufficient number of the laminations, may be laid on the tire case or body and the whole vulcanized.

During normal tractive rolling engagement with the ground the laminations of cord and rubber move into successive contact with the ground and the thrust imposed on the cord or reinforcing elements is taken up to some extent by the cushioning action of the rubber laminations disposed between the reinforcing elements so that a riding action comparable with a standard automobile tire is obtained. Owing to the slightly greater resistance to wear of the rubber laminations slight transverse grooves are formed between the rubber laminations where the ends of the cord are exposed so that in rolling over the ground the traction face of the tire presents a series of cushioning ribs and depressions therebetween which have a suctioning effect in securing adhesion to the road.

Having described my invention I claim and desire to secure by Letters Patent:—

1. A vehicle tire having a tread composed of a series of laminations, certain of the laminations consisting of layers of tread rubber carrying cord treads embedded therein and disposed in lines radial to the tire, certain of the other laminations being composed of cushioning rubber, the laminations of cord carrying rubber being disposed alternately between the laminations of cushioning rubber, the laminations being disposed in lines radial to the tire and extending at right angles to the side faces of the tire. The laminations being relatively narrow and the outer ends of the cord being exposed through the tread face of the tire so as to have direct bearing engagement with the ground, the cushioning layers serving to provide a differential movement between the cord carrying layers and said cushioning layers during normal traction.

2. A vehicle tire having a tread and a body, the body being provided with a layer of cushion rubber extending around the same, and the tread consisting of a series of layers seated on said layer of cushion rubber and disposed in radial relation to the tire, the body having strips of cushion rubber extending around the same and located at the ends of the tread layers, the tread layers extending at right angles to the side faces of the tire and consisting of a series of layers carrying cord threads embedded therein, with the outer ends of the cord threads being disposed flush with the tread face, and another series of layers of cushion tread rubber disposed alternately between the first series, whereby each of said cord carrying layers will lie between two of said cushion layers, the cord threads being disposed in lines radial to the tire, the outer faces of the cord carrying layers and the cushion layers being disposed in the same plane.

3. A vehicle tire consisting of a tire body and a tread, the body having a layer of cushioning rubber enclosing the same, the tread being composed of laminations of rubberized cord and laminations of tread rubber, the laminations being disposed radially to the body of the tire, the laminations of the tread rubber being disposed alternately between the cord laminations, the laminations of cord including cord threads united together to permit of yielding in all directions and being disposed in substantially straight lines in the tread with their outer ends exposed to direct ground contacting engagement during traction, substantially one half of the tread being composed of the cord laminations and one half of the tread rubber laminations, the laminations being relatively narrow, whereby a series of the cord laminations and a series of the rubber tread laminations will have simultaneous traction engagement with the roadbed and will exert equal resistance to skidding in both directions of rotation of the tire against the roadbed; the rubber tread laminations permitting a differential tractive action of the cord laminations.

Signed by me at Springfield, Mass.

EDWARD J. KEARNS.